United States Patent [19]

Tsai

[11] Patent Number: 5,338,992
[45] Date of Patent: Aug. 16, 1994

[54] COIL STRUCTURE OF CEILING FAN MOTOR

[76] Inventor: Wen-Cheng Tsai, No. 1-1, Sec. 2, Tan Fu Rd., Tan Jzi Hsian, Taichung Hsien, Taiwan

[21] Appl. No.: 91,286

[22] Filed: Jul. 15, 1993

[51] Int. Cl.⁵ .............................................. H02K 11/00
[52] U.S. Cl. ..................................... 310/71; 417/423.7
[58] Field of Search .................... 417/423.7, 354, 353; 310/71

[56] References Cited

U.S. PATENT DOCUMENTS

| | | | |
|---|---|---|---|
| 2,742,223 | 4/1956 | Font | 417/354 |
| 4,544,856 | 10/1985 | King | 310/71 |
| 4,640,668 | 2/1987 | Yang | 417/423.7 |
| 5,256,037 | 10/1993 | Chatelain | 417/423.7 |

Primary Examiner—Richard E. Gluck
Attorney, Agent, or Firm—Browdy and Neimark

[57] ABSTRACT

A coil structure of a ceiling fan motor comprises a motor locking body, a shaft, a plurality of coil sets, a coil set, and a plurality of power input wires. The coil set is disposed on the motor locking body and is composed of a plurality of fastening clips, a locking plate and an insulating plate. Each of the fastening clips is provided with a hooked portion for retaining securely an enameled copper wire of the coil sets, and with a retaining groove for holding securely the power input wires, and further with two wings engageable securely with the locking plate under which the insulating plate is disposed.

2 Claims, 3 Drawing Sheets

COIL STRUCTURE OF CEILING FAN MOTOR

FIELD OF THE INVENTION

The present invention relates generally to a ceiling fan motor, and more particularly to a coil structure of the ceiling fan motor.

BACKGROUND OF THE INVENTION

As shown in FIG. 1, a coil structure of a ceiling fan motor of the prior art includes mainly a stator 10 made of the stacked silicon steel sheets, a locking shaft 11 and a plurality of coils 14. The locking shaft 11 has an axial hole 111 and a side hole 112 in communication with the axial hole 111. The side hole 112 is so dimensioned as to permit the power input wires 13 to enter the axial hole 111 through which the power input wires 13 are connected with a switch for a power supply. A plurality of coil sets 14 are disposed in the slots of the stator 10. In accordance with the coil wiring of the motor, the coil sets 14 must include a combination of the prime coil set, the starting coil set and the speed changing coil set. Each of the coil sets 14 has an anterior end and a posterior end, which must be connected with the power input wires 13. In the process of wiring the coil sets 14, the enameled copper wires of the coil sets 14 must be soaked in a chemical solution in which the insulating paint coating of the anterior ends and the posterior ends of the coil sets 14 are dissolved so as to facilitate the work of connecting the coil sets 14 the power input wires 13. The connection of the coil sets 14 with the power input wires 13 must be further enhanced by a tin soldering and insulated by a PVC (polyvinyl chloride) sheath 15 which is wrapped tightly by a cotton thread 16. Such wiring procedures described above are intended to prevent the abnormal operation of the motor and the incident of the power leakage. However, such wiring procedures have a variety of shortcomings, which are explained hereinafter.

The wiring procedures are so labor intensive that the overall cost of making a ceiling fan motor is substantially expensive.

The workman is subjected to danger of a bodily injury in the course of wiring the coil sets 14.

The process of using the chemical solution to dissolve the insulating paint coating of the enameled copper wires of the coil sets 14 is time-consuming and hazardous to the workman's health.

The process of tin soldering must be done only by a skilled workman to ensure that the quality of motor is not compromised.

The insulation sheath 15 of PVC material and the cotton thread 16 are not fire resistant and can catch fire easily by the sparks caused by the short circuit.

SUMMARY OF THE INVENTION

It is therefore the primary objective of the present invention to provide an improved coil structure of a ceiling fan motor, which simplifies the process of making a ceiling fan motor such that the process can be done by a human labor or an automated machine.

It is another objective of the present invention to provide an improved coil structure of a ceiling fan motor, which eliminates the use of the chemical solution to dissolve the paint coating of the wires and the use of tin soldering in the course of connecting the coil sets and the power input wires.

It is still another objective of the present invention to provide an improved coil structure of a ceiling fan motor, which is resistant to fire.

The foregoing objectives of the present invention are attained by a coil structure of a ceiling fan motor, which comprises a stator made of a plurality of silicon steel sheets stacked together, a plurality of stator coils, a coil set, and an insulating plate. The stator coils are disposed in the slots of the stator of the motor for use in generating a magnetic field to drive the rotor of the motor. The coil set is fastened by rivets to the stator of the motor and is composed of a plurality of fastening clips locking plate, and of an insulating plate. Each of the fastening clips is provided at the top end thereof with a hooked portion for use in connecting the enameled copper wires of the coil sets. The fastening clip is further provided with a retaining groove for use in fastening the power input wire, and with two wings engageable with the locking plate. The insulating plate is disposed under the locking plate such that the insulating plate serves to insulate the fastening clips from the stator of the motor.

The foregoing objectives, features and functions of the present invention will be better understood by studying the following detailed description of the present invention in conjunction with the accompanying drawings.

DETAILED DESCRIPTION OF THE INVENTION

Figure 1:
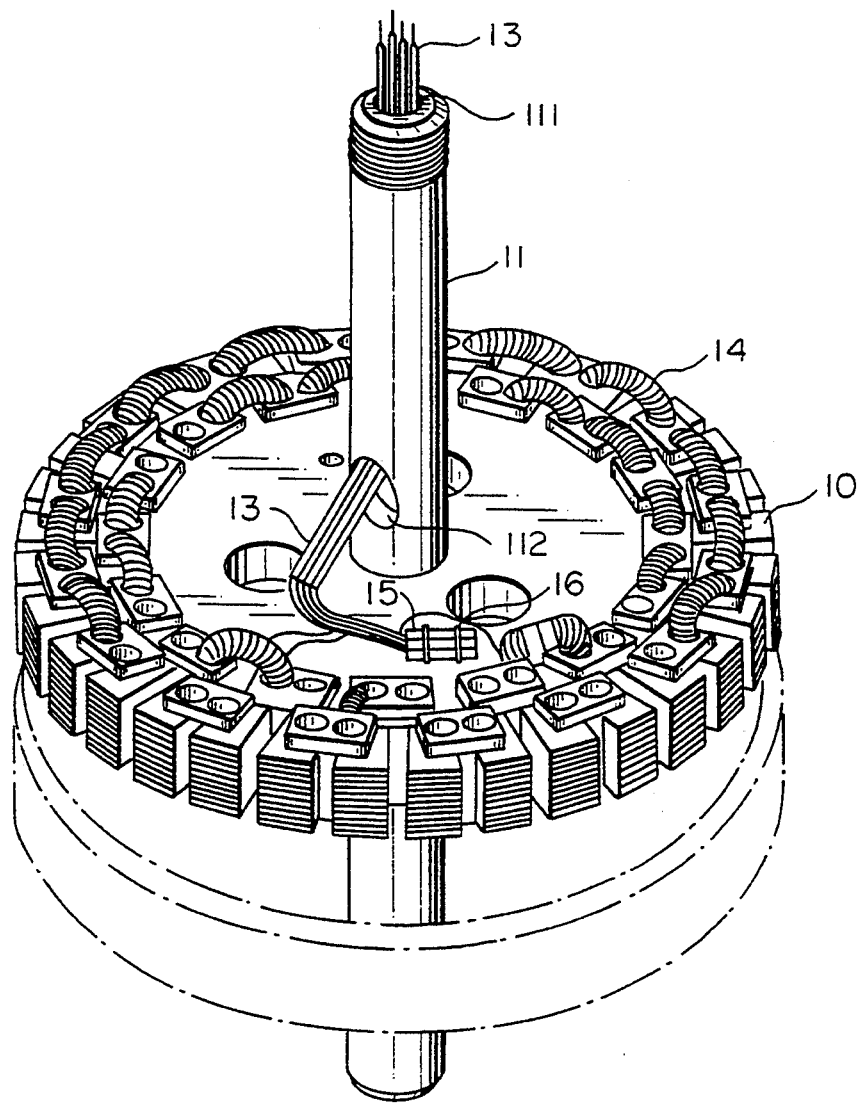
FIG. 1 shows a perspective schematic view of a coil structure of a ceiling fan motor of the prior art.
Figure 2:
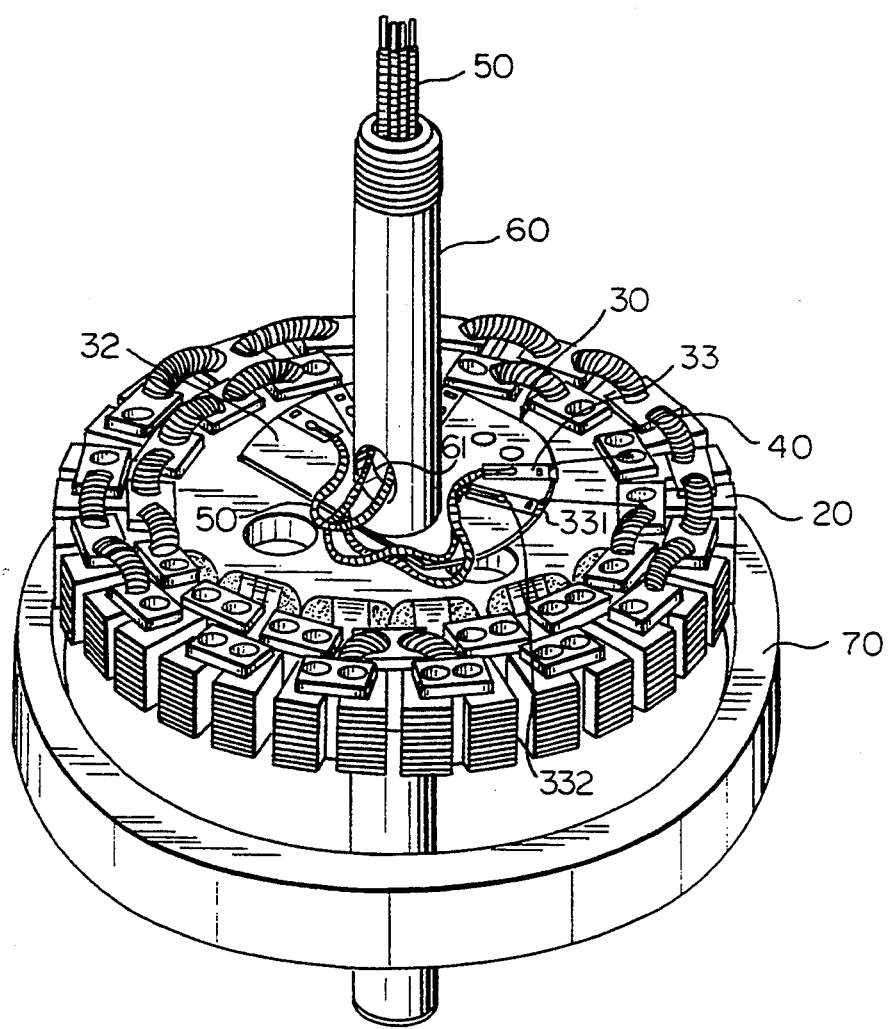
FIG. 2 shows a perspective schematic view of a coil structure of a ceiling fan motor of the present invention.
Figure 3:
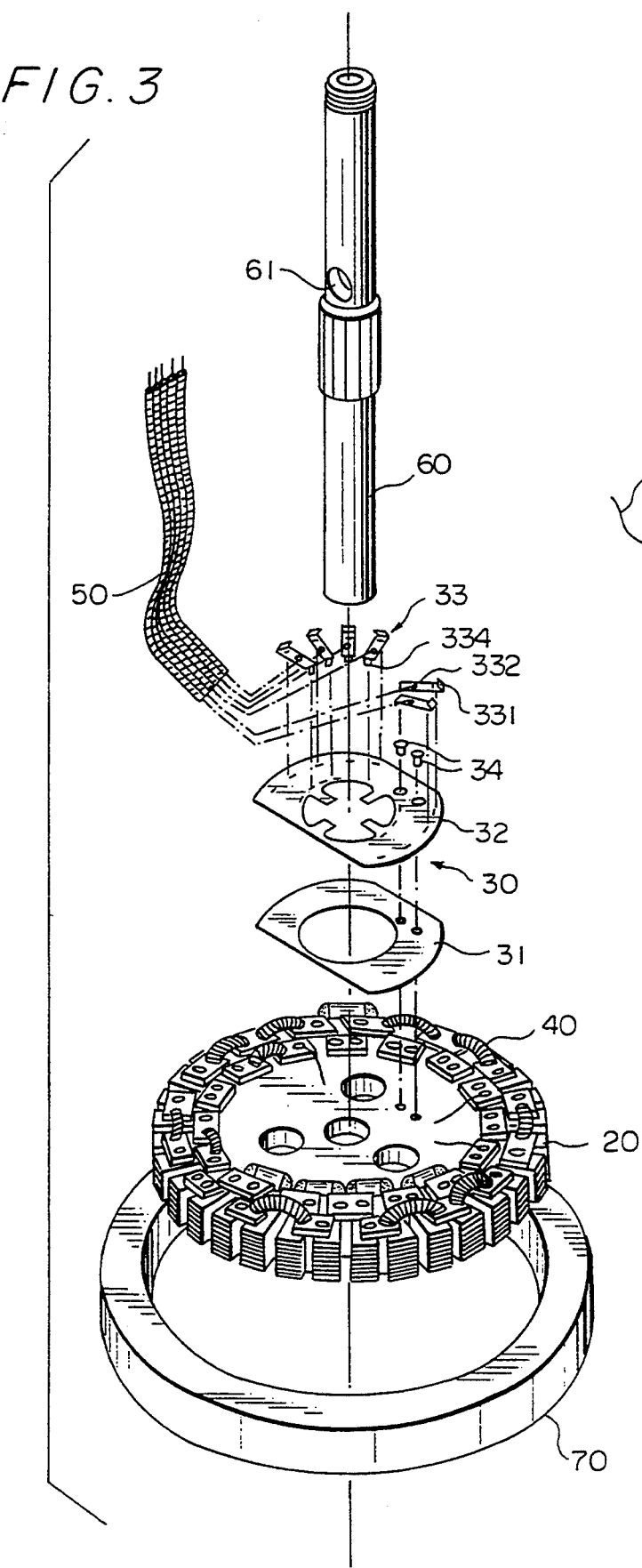
FIG. 3 shows an exploded view of the coil structure of the ceiling fan motor of the present invention as shown in FIG. 2.
Figure 4:
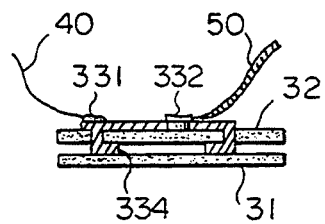
FIG. 4 shows an enlarged schematic view of the fastening clip of the present invention.

Referring to FIGS. 2-4, the coil structure of the present invention is shown to comprise mainly a stator 20 provided thereon with a coil set 30 which is composed of an insulating plate 31, a locking plate 32, and a plurality of fastening clip 33. The insulating plate 31 and the locking plate 32 are made of a heat-resistant and incombustible material by punching. The fastening clips 33 are made of copper or other conductive material by punching. Each of the fastening clips 33 is provided at the top end thereof with a hooked portion 331 for use in fastening the enameled copper wire of each coil set 40 by point welding. The point welding causes the destruction of the paint coating of the enameled copper wire and eliminates the use of the chemical solution to dissolve the paint coating of the enameled copper wire as taught by the prior art. Located at the midpoint of the fastening 33 is a retaining groove 332 for use in holding securely a power input wire 50 by point welding. The fastening clips 33 is further provided at each end thereof with two wings 334 which can be fastened securely to the locking plate 32. The insulating plate 31 is disposed under the locking plate 32 which is fixed to stator 20 by rivets 34 such that the insulating plate 31 insulates the fastening clip 33 from the stator 20, thereby preventing the leakage of electricity. The stator 20 is provided at the center thereof with a hollow spindle 60 having a circumferential wall provided with a through hole 61 dimensioned to permit the power input wires 50 to pass therethrough so as to enter the hollow spindle 60 before emerging from the top opening of the hollow spindle 60 to be connected with a power source and switch. As soon as the power source is turned on, the coil sets 40 generate a magnetic field to drive a rotor 70, which in turn drives the fan blades.

The present invention has the advantages over the prior art. Such advantages are described hereinafter.

The coil structure of the present invention permits the manufacturing process of the ceiling fan motor to be automated so as to reduce the cost of the mass production of the ceiling fan motor.

The coil structure of the present invention is so simple in design that it can be made by an unskilled worker without compromising its quality.

The quality and the production rate of the present invention are substantially improved by using the method of point welding in the wiring of the present invention. The present invention uses no chemical solution in the wiring, thereby resulting in a substantial reduction in the cost of making the present invention. The prior art uses the chemical solution in the wiring. Such chemical solution is not only expensive but also hazardous to a worker's health.

The connection portions of the coil sets of the present invention is fixed on the heat-resisting and incombustible plates and is therefore invulnerable to catching fire caused by the over-heating of the motor or by the short circuit.

The embodiment of the present invention described above is to be regarded in all respects as merely illustrative and not restrictive. Accordingly, the present invention may be embodied in other specific forms without deviating from the spirit thereof. Therefore, the present invention is to be limited only by the scope of the following appended claims.

What is claimed is:

1. A coil structure of a ceiling fan motor comprising:
   a stator made up of a plurality of silicon steel sheets stacked together;
   a spindle mounted centrally in said stator and provided with an axial hole and a circumferential wall with a through hole communicating with said axial hole;
   a plurality of stator coils disposed in slots of said stator, with said slots being equal in number to said stator coils; and
   a plurality of power input wires connecting said stator coils with a switch for a power source;
   wherein said stator is provided thereon with a coil set having a plurality of fastening clips, a locking plate and an insulating plate, with each of said fastening clips having a hooked portion for retaining securely an enameled copper wire of said stator coils and further having a retaining groove for holding securely said power input wires and still further having two wings engageable securely with said locking plate under which said insulating plate is disposed.

2. The coil pivoting structure according to claim 1 wherein said locking plate is riveted to said stator.

* * * * *